United States Patent
Niemoeller

(10) Patent No.: US 10,237,767 B2
(45) Date of Patent: Mar. 19, 2019

(54) METHOD AND SCORE MANAGEMENT NODE FOR SUPPORTING EVALUATION OF A DELIVERED SERVICE

(71) Applicant: Telefonaktiebolaget LM Ericsson (publ), Stockholm (SE)

(72) Inventor: Joerg Niemoeller, Sundbyberg (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 154 days.

(21) Appl. No.: 15/132,446

(22) Filed: Apr. 19, 2016

(65) Prior Publication Data
US 2016/0373950 A1   Dec. 22, 2016

Related U.S. Application Data

(60) Provisional application No. 62/180,340, filed on Jun. 16, 2015.

(51) Int. Cl.
*H04L 29/08* (2006.01)
*H04W 24/08* (2009.01)
*H04W 28/24* (2009.01)
*G06F 17/30* (2006.01)
*H04L 29/06* (2006.01)

(52) U.S. Cl.
CPC ........ *H04W 24/08* (2013.01); *G06F 17/3053* (2013.01); *H04L 65/80* (2013.01); *H04L 67/322* (2013.01); *H04W 28/24* (2013.01); *H04L 67/02* (2013.01)

(58) Field of Classification Search
CPC ....... H04L 65/80; H04L 67/02; H04L 67/322; H04W 24/08; H04W 28/24; G06F 17/3053
See application file for complete search history.

(56) References Cited

U.S. PATENT DOCUMENTS

| | | | |
|---|---|---|---|
| 7,430,179 B2 * | 9/2008 | Towns-von Stauber | H04L 1/20 370/252 |
| 7,577,246 B2 * | 8/2009 | Idan | H04M 3/5175 379/265.01 |
| 7,894,446 B2 * | 2/2011 | Kangru | H04L 41/22 370/395.21 |
| 8,081,565 B2 * | 12/2011 | Moore | H04L 29/06027 370/229 |

(Continued)

FOREIGN PATENT DOCUMENTS

EP      1447940 A2 *  8/2004  ............ H04L 43/50

*Primary Examiner* — Alpus Hsu
(74) *Attorney, Agent, or Firm* — Rothwell, Figg, Ernst & Manbeck, p.c.

(57) ABSTRACT

A method and score management node for supporting service evaluation of a service delivered by means of a telecommunication network. The score management node receives network measurements (v) related to at least one service event when the service is delivered to the user, and calculates a quality score Q for each received network measurement by applying a predefined scoring algorithm Q(v) on the network measurement. After identifying, among the calculated quality scores, quality scores Q which are related to a specific service session experienced by the user, the score management node determines a total session-specific quality score for the specific service session based on the identified quality scores Q. The determined total session-specific quality score can then be used for evaluation of the delivered service.

26 Claims, 7 Drawing Sheets

(56) References Cited

U.S. PATENT DOCUMENTS

| | | | | |
|---|---|---|---|---|
| 8,386,495 | B1* | 2/2013 | Sandler | G06F 17/30958 |
| | | | | 707/748 |
| 8,620,746 | B2* | 12/2013 | Granville | G06Q 30/02 |
| | | | | 370/229 |
| 8,755,831 | B2* | 6/2014 | Brewer | H04W 72/10 |
| | | | | 455/450 |
| 9,344,908 | B2* | 5/2016 | Wynn | H04L 41/5067 |
| 9,349,103 | B2* | 5/2016 | Eberhardt, III | G06N 7/005 |
| 9,674,515 | B2* | 6/2017 | Wildfeuer | H04N 17/004 |
| 9,727,644 | B1* | 8/2017 | Teng | G06Q 50/01 |
| 9,779,422 | B2* | 10/2017 | Rao | G06Q 30/0273 |
| 2003/0167195 | A1* | 9/2003 | Fernandes | G06Q 10/06311 |
| | | | | 705/7.13 |
| 2007/0036087 | A1* | 2/2007 | Kangru | H04L 1/20 |
| | | | | 370/252 |
| 2008/0306830 | A1* | 12/2008 | Lasa | G06Q 30/02 |
| | | | | 705/14.16 |
| 2012/0123867 | A1* | 5/2012 | Hannan | G06Q 30/0261 |
| | | | | 705/14.58 |
| 2013/0218683 | A1* | 8/2013 | Hannan | G06Q 30/0261 |
| | | | | 705/14.58 |
| 2013/0266126 | A1* | 10/2013 | Dunne | H04M 3/2227 |
| | | | | 379/32.01 |
| 2014/0181266 | A1* | 6/2014 | Joch | H04L 65/605 |
| | | | | 709/219 |
| 2015/0029871 | A1* | 1/2015 | Frost | H04L 41/5038 |
| | | | | 370/252 |
| 2015/0188940 | A1* | 7/2015 | Lapidous | H04W 12/12 |
| | | | | 726/15 |
| 2015/0248680 | A1* | 9/2015 | Chen | G06Q 30/0202 |
| | | | | 705/7.31 |

\* cited by examiner

METHOD AND SCORE MANAGEMENT NODE FOR SUPPORTING EVALUATION OF A DELIVERED SERVICE

CROSS REFERENCE TO RELATED APPLICATIONS

This application claims the benefit of U.S. provisional patent application No. 62/180,340, filed on Jun. 16, 2015, which is incorporated by reference.

TECHNICAL FIELD

The present disclosure relates generally to a method and a score management node for supporting service evaluation of a service delivered by means of a telecommunication network.

BACKGROUND

When a service has been delivered by means of a telecommunication network by a service provider to one or more users, it is of interest for the service provider to know whether the user is satisfied with the delivered service or not, e.g. to find out if the service has shortcomings that need to be improved in some way to make it more attractive to this user and to other users. Service providers, e.g. network operators, are naturally interested in making their services as attractive as possible to users in order to increase sales, and a service may therefore be designed and developed so as to meet the users' demands and expectations as far as possible. It is therefore useful to gain knowledge about the users' opinion after service delivery in order to evaluate the service. The services discussed in this disclosure may, without limitation, be related to streaming of audio and visual content e.g. music and video, on-line games, web browsing, file downloads, voice and video calls, delivery of information e.g. in the form of files, images and notifications, and so forth, i.e. any service that can be delivered by means of a telecommunication network.

A normal way to obtain the users' opinion about a delivered service is to explicitly ask the customer, after delivery, to answer certain questions about the service in a survey or the like. For example, the service provider may send out or otherwise present an inquiry form, questionnaire or opinion poll to the customer with various questions related to user satisfaction of the service and its delivery. If several users respond to such a poll or questionnaire, the results can be used for evaluating the service, e.g. for finding improvements to make, provided that the responses are honest and that a significant number of users have answered. An example of using survey results for estimating the opinion of users is the so-called Net Promoter Score, NPS, which is calculated from answers to user surveys to indicate the users' collected opinions expressed in the survey answers.

However, it is often difficult to motivate a user to take the time and trouble to actually answer the questions and send a response back to the service provider. Users are often notoriously reluctant to provide their opinions on such matters, particularly in view of the vast amounts of information and questionnaires flooding users in the current modern society. One way to motivate the user is to reward him/her in some way when submitting a response, e.g. by giving some present or a discount either on the purchased services or when buying future services, and so forth.

Even so, it is a problem that surveys can in practice only be conducted for a limited number of users which may not be representative for all users of a service, and that the feedback cannot be obtained in "real-time", that is immediately after service delivery. A survey should not be sent to a user too frequently either. The obtained feedback may thus get out-of-date.

Further problems include that considerable efforts and costs must be spent to distribute a survey to a significant but still limited number of users and to review and evaluate all answers coming in, sometimes with poor results due to low responsiveness. Furthermore, the user may provide opinions which are not really accurate or honest and responses to surveys may even be misleading. For example, the user is often prone to forget how the service was actually perceived or experienced when it was delivered, even after a short while, once prompted to respond to a questionnaire. Human memory thus tends to change over time, and the response given may not necessarily reflect what the user really felt and thought at service delivery. The user may further provide the response very hastily and as simply as possible not caring much if it really reflects their true opinion. The opinion expressed may also be dependent on the user's current mood such that different opinions may be expressed at different occasions, making the response all the more erratic and unreliable.

Still another problem is that it can be quite difficult to trace an underlying reason why users have been dissatisfied with a particular service, so as to take actions to eliminate the fault and improve the service and/or the network used for its delivery. Tracing the reason for such dissatisfaction may require that any negative opinions given by users need to be correlated with certain operational specifics related to network performance, e.g. relating to where, when and how the service was delivered to these users. This kind of information is not generally available and analysis of the network performance must be done manually by looking into usage history and history of network issues. Much efforts and costs are thus required to enable tracing of such faults and shortcomings.

SUMMARY

It is an object of embodiments described herein to address at least some of the problems and issues outlined above. It is possible to achieve this object and others by using a method and a score management node as defined in the attached independent claims.

According to one aspect, a method is performed by a score management node for supporting service evaluation of a service delivered to a user by means of a telecommunication network. In this method, the score management node receives network measurements related to at least one service event when the service is delivered to the user. The score management node further calculates a quality score Q for each received network measurement by applying a predefined scoring algorithm $Q(v)$ on the network measurement.

The score management then identifies, among the calculated quality scores, quality scores Q which are related to a specific service session experienced by the user, and determines a total session-specific quality score for the specific service session based on the identified quality scores Q. The total session-specific quality score is used for evaluation of the delivered service.

According to another aspect, a score management node is arranged to support service evaluation of a service delivered to a user by means of a telecommunication network. The score management node comprises a processor and a memory containing instructions executable by the processor, whereby the score management node is configured to operate as follows.

The score management node is configured to receive network measurements related to at least one service event when the service is delivered to the user. The score management node is further configured to calculate a quality score Q for each received network measurement by applying a predefined scoring algorithm Q(v) on the network measurement, and to identify, among the calculated quality scores, quality scores Q which are related to a specific service session experienced by the user.

The score management node is also configured to determine a total session-specific quality score for the specific service session based on the identified quality scores Q, wherein the total session-specific quality score is used for evaluation of the delivered service.

When employing the above method and/or score management node, the determined total session-specific quality score can be used in the service evaluation as an estimation of the users' opinion of the specific service session. Further, since the total session-specific quality score is calculated from technical measurements in the network related to a specific service session, it is possible to evaluate the performance of that service session based on the total session-specific quality score. The resulting total session-specific quality score can thus be regarded as a truthful estimation of the user's experience of the service when it was delivered in this specific service session.

A computer program storage product is also provided comprising instructions which, when executed on at least one processor in the score management node, cause the at least one processor to carry out the method described above for the score management node.

The above method and score management node may be configured and implemented according to different optional embodiments to accomplish further features and benefits, to be described below.

BRIEF DESCRIPTION OF DRAWINGS

The solution will now be described in more detail by means of exemplary embodiments and with reference to the accompanying drawings, in which.

DETAILED DESCRIPTION

Figure 1:
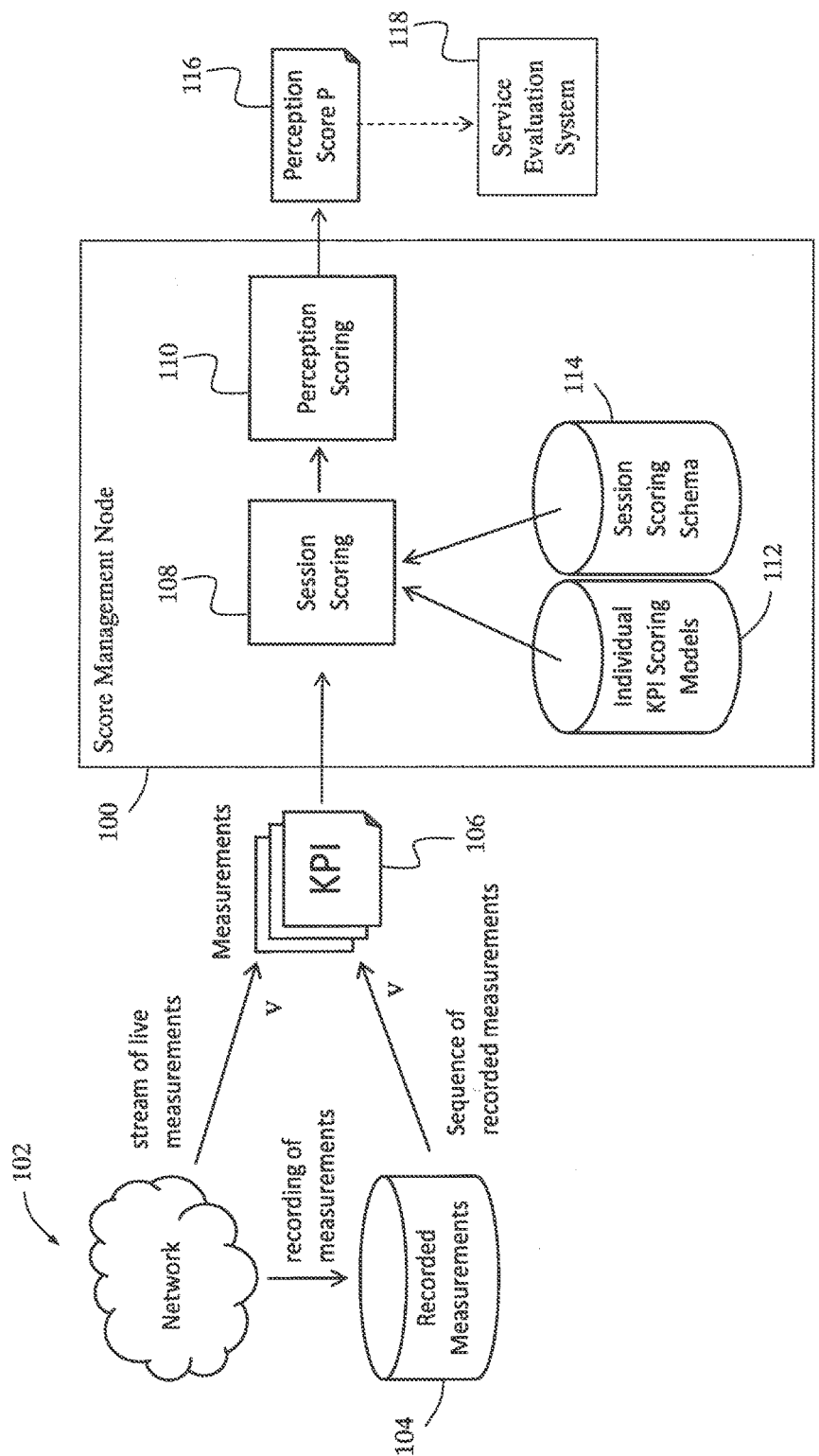
FIG. 1 is a block diagram illustrating an example of how a score management node may be configured and operate, according to some possible embodiments.

The embodiments described in this disclosure can be used for supporting evaluation of a service by obtaining an estimated user opinion about the service when it has been delivered to a user by means of a telecommunication network. The embodiments will be described in terms of functionality in a "score management node". Although the term score management node is used here, it could be substituted by "score management system" or similar term throughout this disclosure.

Briefly described, a session-specific quality score that reflects the user's experience of the service, is determined based on technical network measurements made for at least one event or occasion when the service was delivered to the user, hereafter referred to as a "service event" for short. For example, the network measurements may relate to the time needed to download data, the time from service request until delivery, call drop rate, data rate and data error rate. The quality score is determined for a specific service session when the service is delivered to the user which may generate several different measurements in the network. The term "session-specific quality score" will be used in this disclosure to denote a quality score that has thus been determined for a specific service session. The session-specific quality score thus reflects the user's experience of the service when it was delivered in this specific service session.

In the following description, any network measurements related to delivery of a service to the user by means of a telecommunication network are generally denoted "v" regardless of measurement type and measuring method. It is assumed that such network measurements v are available in the network, e.g. as provided from various sensors, probes and counters at different nodes in the network, which sensors, probes and counters are commonly used for other purposes in telecommunication networks of today, thus being operative to provide the network measurements v to the score management node for use in this solution. Key Performance Indicator, KPI, is a term often used in this field for parameters that in some way indicate network performance.

Further, the term "delivery of a service by means of a telecommunication network" may be interpreted broadly in the sense that it may also refer to any service delivery that can be recorded in the network by measurements that somehow reflect the user's experience of the service delivery. Some further examples include services provided by operator personal aided by an Operation and Support System, OSS, infrastructure. For example, "Point of sales" staff may be aided by various software tools for taking and executing orders from users. These tools may also be able to measure KPIs related to performance of the services. Another example is the Customer Care personal in call centers who are aided by some technical system that registers various user activities. Such technical systems may as well make network measurements related to these activities as input to the score management node.

For example, the network measurements v may be sent regularly from the network to the score management node, e.g. in a message using the hyper-text transfer protocol http or the file transfer protocol ftp over an IP (Internet Protocol) network. Otherwise the score management node may fetch the measurements v from a measurement storage where the network stores the measurements. In this disclosure, the term "network measurement v" may also refer to a KPI which is commonly prepared by the network to reflect actual physical measurements. The concept of KPIs is well-known as such in telecommunication networks. In this disclosure, the terms measurement, metric and KPI may be used interchangeably.

Figure 2:
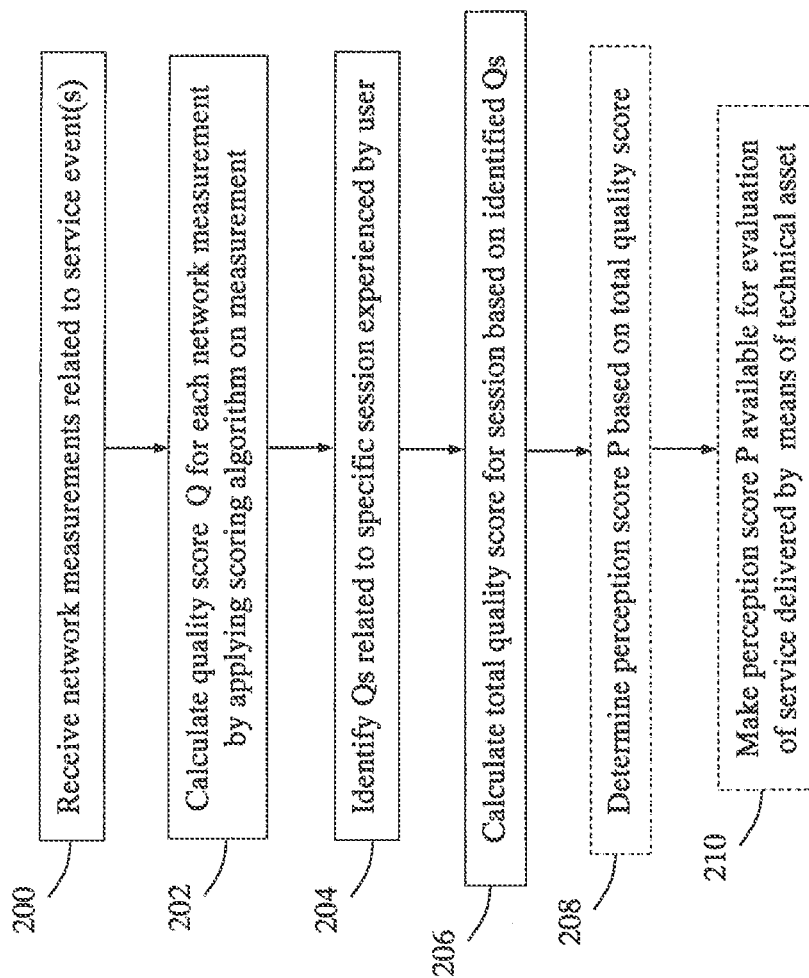
FIG. 2 is a flow chart illustrating a procedure in a score management node, according to further possible embodiments.

It will now be described how a score management node may operate, with reference to FIG. 1 and also to the flow chart in FIG. 2. FIG. 1 illustrates a score management node 100 which receives network measurements v made in a telecommunication network 102, while FIG. 2 illustrates a procedure with actions performed by the score management node 100, to accomplish the functionality described in this disclosure. The score management node 100 is operative to support service evaluation of a service delivered to a user by means of a telecommunication network.

In this procedure, the network measurements v may be sent from the network 102 more or less in real-time in a "live stream" fashion, e.g. from an Operation & Maintenance, O&M, node or similar, not shown. Alternatively, the network measurements v may be recorded by the network in a suitable storage or database 104 which can be accessed by the score management node 100, e.g. at regular intervals.

The received network measurements v can be seen as "raw data" being used as input in this procedure. For example, the above O&M node may be an aggregation point or node for distributed sensors and probes that make measurements in the traffic flows throughout the network. This node may combine, correlate and generally process the measurement data in some way, e.g. to produce KPIs or the like.

A first action 200 illustrates that the score management node 100 receives network measurements v related to at least one service event when the service is delivered to the user. This operation may be performed in different ways, e.g. when the network 102 sends a stream of network measurements as they are generated, or by fetching network measurements from a measurement storage 104, as described above. Action 200 may thus be executed continuously or regularly any time during the course of this process including the following actions. The protocol used in this communication may be the hyper-text transfer protocol http or the file transfer protocol ftp, and the network measurements may be received in a message such as a regular http message or ftp message. In some possible embodiments, the score management node may thus receive the network measurements in a message according to the hyper-text transfer protocol http or the file transfer protocol ftp.

In some further possible but non-limiting embodiments, the network measurements may be related to any of: the time needed to download data, the time from service request until delivery, call drop rate, data rate, and data error rate. In another possible embodiment, the network measurements may be made during a predefined time interval. FIG. 1 illustrates that the network measurements are used to produce various KPIs 106 which are obtained by the score management node 100.

In a next action 202, the score management node 100 calculates a quality score Q for each received network measurement by applying a predefined scoring algorithm Q(v) on the network measurement. Some examples of how the quality score Q may be calculated in this action by means of Q(v) will be described later below. A set of calculated quality scores Q is then used as input in the next action 204 where the score management node identifies quality scores Q which are related to a specific service session experienced by the user. Actions 202 and 204 may be performed by a module for session scoring 108.

In a next action 206, the score management node 100 determines a total session-specific quality score for the service session based on the identified quality scores Q. The total session-specific quality score is then used for evaluation of the delivered service, which may be done in different possible ways. For example, different session-specific quality scores may be determined for different service sessions when the service was delivered, and each session-specific quality score may be used as an estimation of a user's experience of the corresponding individual service session or service event.

Another option is to use multiple session-specific quality scores as a basis for determining a more generic perception score P reflecting how the service is perceived at any service session in general. A next optional action 208 illustrates that the score management node 100 may, in another possible embodiment, determine a perception score P based on the total session-specific quality score that has been determined as of actions 200-206, the perception score P reflecting a user experience of a service, which may be performed by a module for perception scoring 110. In this case, another possible embodiment is that the perception score P may be determined based on several total session-specific quality scores calculated for multiple service sessions.

Finally, the perception score P may be made available, in an optional action 210, for use in evaluation of the service, as indicated by numeral 116 in FIG. 1, e.g. by sending P to a service evaluation system 118 or by saving P in a suitable storage, not shown in FIG. 1.

The protocol used for sending P to a service evaluation system 118 may be e.g. the hyper-text transfer protocol http or the file transfer protocol ftp, and the perception score P may be sent to the service evaluation system 118 in an http message or an ftp message over an IP network. The service evaluation system 118 or storage may comprise an SQL (Structured Query Language) database or any other suitable type of database.

In action 208, the perception score P may be calculated in several different ways and some illustrative but non-limiting examples of how it could be calculated will be described in more detail later below. It will thus be described how the perception score P may be calculated from network measurements which is thus also applicable for session-specific quality scores.

Some further possible but non-limiting embodiments in the procedure of FIG. 2 will now be described. In one possible embodiment, the total session-specific quality score may be determined based on a session scoring schema comprising a set of weighted measurement types such that the total session-specific quality score is calculated as a weighted average of the identified quality scores Q where each quality score Q is weighted according to the type of measurement used for determining said quality score Q. Thereby, it may be selected how much influence different measurement types will have on the resulting total session-specific quality score, which could be useful since a certain measurement type may be more relevant or significant to some services than to other services. Similarly, a certain measurement type may be more relevant or significant than other measurement types to a particular service.

In another possible embodiment, the above-mentioned session scoring schema may be selected from a set of predefined session scoring schemas depending on which types of network measurements have been made for the at least one service event. In another possible embodiment, each session scoring schema in the set of predefined session scoring schemas may in this case comprise an entry criteria indicating at least one mandatory measurement type and/or at least one optional measurement type. Some examples of how the above session scoring schemas, measurement types and entry criteria may be employed in this procedure, will be described in more detail later below.

In another possible embodiment, the session scoring schema may be selected further depending on priorities assigned to the session scoring schemas in the set of predefined session scoring schemas. In another possible embodiment, the session scoring schemas in the set of predefined session scoring schemas may be defined for different services or experience types.

In the above-described embodiments involving usage of different session scoring schemas and measurement types, the operation of determining the total session-specific quality score can be configured in a flexible manner and adapted to any kind of service delivery scenarios so as to achieve as accurate session-specific quality score as possible. In another possible embodiment, the measurement types discussed above may include one or more Key Performance Indicators, KPIs.

Some examples of how the above-described scoring modules 108 and 110 may be implemented in practice will now be outlined. Each of the scoring modules 108 and 110 may be implemented as a piece of software executed by a suitable execution platform. This includes the possibility to have the scoring modules 108 and 110 compiled into one program. In this example, the scoring modules may be software modules, e.g. in the form of Java classes, that are compiled into a single piece of software that contains the entire score calculation as exemplified above. A scoring coordinator may be used for controlling the operation of each scoring mode.

Alternatively, a potentially more flexible implementation may be used where the different operations described herein, e.g. the above scoring modules 108 and 110, are treated as separate services implemented by distinct pieces of software. These services could for example be Service-Oriented Architecture, SOA, Web Services. It would also possible to have the functions implemented as "worker nodes" in a stream processing environment such as "Storm". In general, each functional module may be a logical scoring node that can be realized in software and can be either co-deployed on one physical node or separated and deployed into a set of physical processing nodes.

The scoring of user experience, referred to as perception scoring, may be employed according to various practical implementations. Examples of this include Net Promoter Score (NPS), Mean Opinion Scores (MOS) and Service Level Index (SLI). While the Net Promoter Score is merely based on user studies, the MOS and SLI are used for obtaining predictive scores. These scores are mostly based on learned models that are used to predict user's opinion about his/her experiences for example when using services. Input to these models may typically be comprised of KPI and metrics, i.e. the above-described network measurements, coming from various sources in the network and the OSS/BSS infrastructure of the service provider / operator. The MOS may be used as input to the Service Level Index scoring.

Perception scoring based on metrics and KPI obtained from a network and/or OSS/BSS infrastructure may have at least the following two problems:

(1) Missing Data: Network measurements may be missing due to temporary errors in the measurement and reporting infrastructure.

(2) Correlated Experience: Network measurements such as KPI and various metrics are collected broadly. For some service type there are more network measurements available than for others. A simple scoring that scores each measurement individually would involve many more data points for experiences that happen to have more measurements. This can lead to an imbalance from higher representation of the underlying services. This under- and overrepresentation of certain services is not based on actual influencing factors on user experience and perception, but it is the result of an implementation detail.

Conventionally, each scoring, i.e. calculation of a perception score P reflecting a user experience of a service, is performed for each individual network measurement. In the solution described herein, it has been realized that an improved scoring result may be obtained if the scoring would be done per service session rather than per individual measurement. To achieve such a session-specific perception or quality score, which may also be referred to as "session score" for short, measurements are first consolidated per service session to create a session score or quality score for each individual session, i.e. the above-described session-specific quality score. An overall perception score can then be calculated based on the session scores rather than directly based on the raw measurements.

MOS scores are already a kind of session scores which can be used as input to perception scoring models, e.g. like the scoring model that generates the SLI score. It is however a problem that MOS scores are not defined for every service type and every user experience. Also the "maturity" of the underlying MOS calculation models may vary considerably.

Another problem that has been identified and realized in this solution is that the notion of what a "service session" actually is may vary considerably depending on the type of service. A general definition in the context of perception scores might be that any operation in the network that results in a unique experience for a human user could be considered a "service session". Sometimes this definition coincides with a technical session. An illustrative but non-limiting example of this would be a voice call.

Sometimes however, the technical definition of a service session does not help to understand the unique experience of the human user and therefore the notion of a service session being used for perception scoring may be somewhat indefinite. Another typical example is mobile web surfing. Every click made by the user leading to downloading a website would qualify to be a session in the technical sense. However, the human user would tend to consider all websites used until he/she has found the needed information, to be jointly a single unique experience. Here the technical notion of a service session is not very accurate or relevant.

Another illustrative but non-limiting example may involve experiences in Customer Care. The user may have called to report a problem. This single phone call can be considered to be an "experience" for the user, but the entire process from reporting the error until it is solved can be defined as a "customer care session" which could also be considered to be a single unique experience for the user, even if it might involve multiple technical sessions such as calls or the usage of other channels. In any case, it would be beneficial for the perception scoring if multiple network measurements could first be summarized into a session score.

In this disclosure, a method and apparatus for generating session scores from any stream of input data, are described. It could be considered "opportunistic" in the sense, that it will make the best out of the presented raw data. The session score, i.e. session-specific perception score, generated according to embodiments described herein effectively expresses the perceived quality of each experience. It is therefore generating something similar to a Mean Opinion Score.

In this procedure, a first operation may be to calculate a quality score for each of the individual network measurements. This produces a quality score Q for every measurement in the service session.

The second operation may then be to apply a configurable set of schema for session score calculation, and this schema will be referred to as a "session scoring schema". This schema can be used to calculate a total session-specific quality score for the service session from the individual KPI specific quality scores.

It was mentioned above that some possible embodiments may involve different session scoring schemas, measurement types and entry criteria for use in the procedure of FIG. 2. It will now be described in more detail how this may be done.

Each session scoring schema may have a priority and an entry condition, which is thus the above-mentioned "entry criteria", which should be fulfilled when selecting the session scoring schema for use in this procedure. If the entry criteria is met, this calculation schema can be used to obtain a total session-specific quality score Q. One option is that the session scoring schema that has the highest priority is selected while the entry criteria is met.

There is also a last fallback schema at lowest priority that is always the same and applied if all other configured schemas could not be applied due to their entry criteria. It will simply provide a session score as an average of all individual session-specific Q scores.

It is an advantage that the solution and its embodiments described herein may provide higher accuracy in the generation of session-specific quality scores and possibly also subjective perception scores. It may thus be possible to generate such scores for any type of service or experience even if no dedicated MOS are available.

The Session Based Scoring module 108 may be introduced as a pre-processing operation prior to a perception scoring operation. This way the main scoring will not get individual network measurements as input, but quality scores determined per experienced service session. This session based scoring may be configured by definition of the scoring models 112 for each individual KPI, i.e. network measurement, and the Session Scoring Schemas 114.

Figure 3:
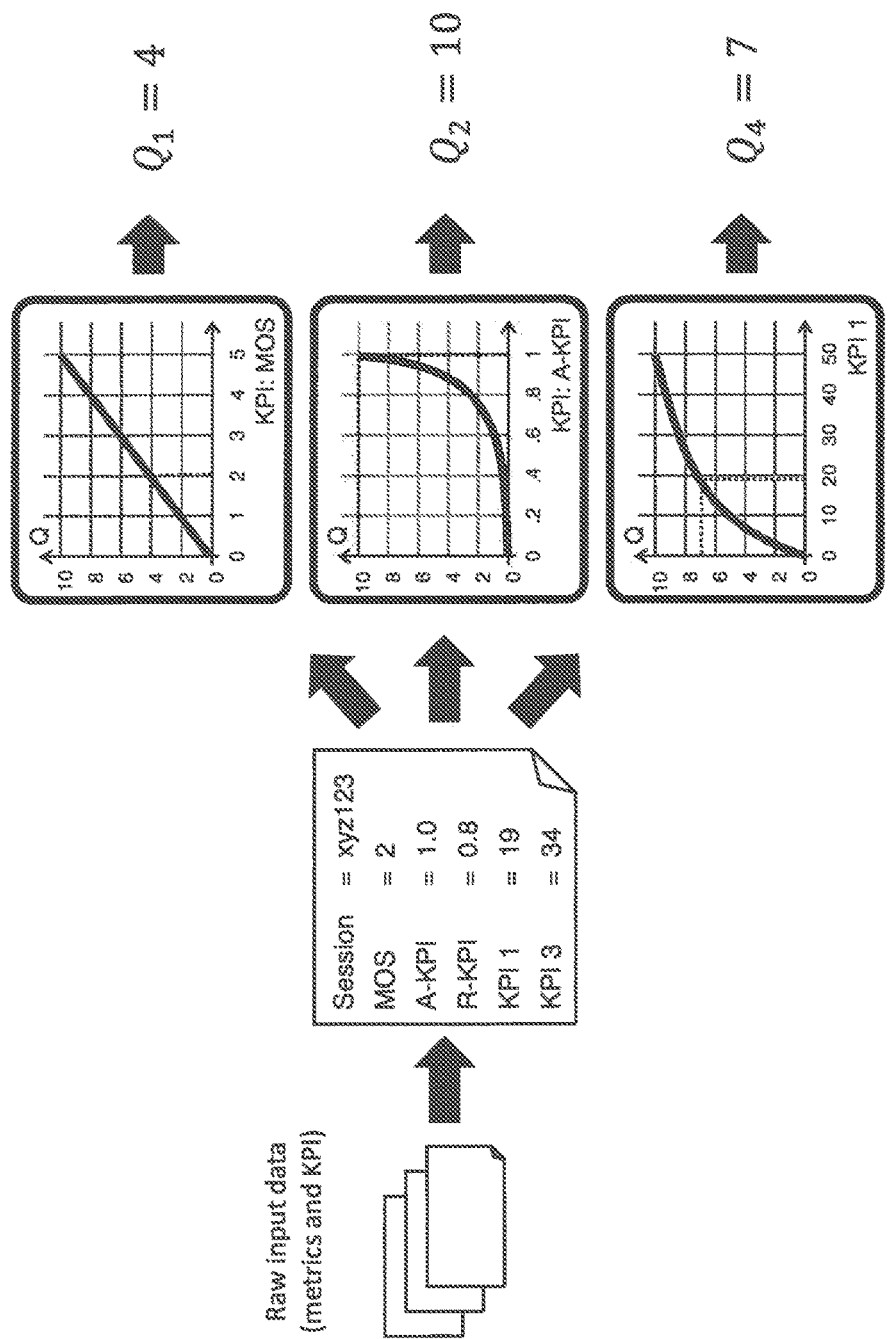
FIG. 3 is a diagram illustrating an example of how a score management node may operate, according to further possible embodiments.

Some further examples of a procedure for determining a session-specific quality score will now be described again with reference to FIG. 1. In this procedure, individual quality scores may be calculated for different network measurements, such as KPIs, as shown in FIG. 3. In this example, the term KPI is used to represent any network measurements although the example could be applicable for any type of network measurements. A set of KPIs is taken as input and an individual scoring is applied to generate a quality score Q for each of the KPIs. In this example, a scoring function Q(v) is used that directly provides a quality score Q from the KPI value. Thus, Q1=4 is obtained from the KPI value MOS=2, Q2=10 is obtained from the KPI value A-KPI=1.0, and Q3=4 is obtained from the KPI value KPI 1=19. These scoring functions are configured for example in the database of Individual KPI scoring models 112 shown in FIG. 1.

If the KPI is already a MOS originating from some previous scoring operation, the KPI can be used directly. The scoring function would then be a linear function that only might apply a value range conversion.

Different predefined session scoring schemas may have different priorities. They may be stored in a data storage 114 for Session Scoring Schemas as shown in FIG. 1. For example, for different service or experience types there could be different sets of session scoring schemas.

Figure 4:
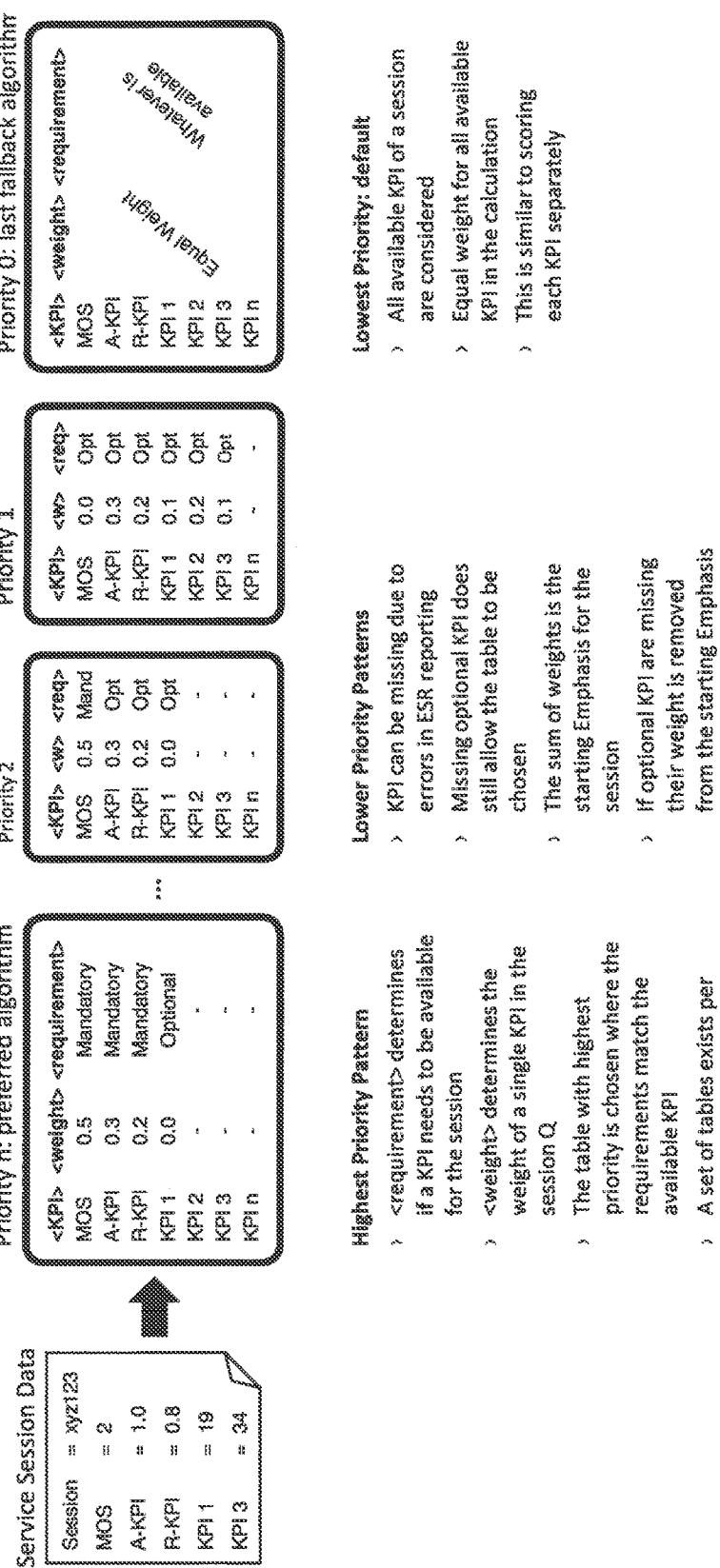
FIG. 4 is a diagram illustrating another example of how a score management node may operate, according to further possible embodiments.

FIG. 4 shows four different examples of session scoring schemas denoted Priority n, Priority 2, Priority 1 and Priority 0, where Priority n has the highest priority. Each session scoring schema is defined by a set of KPIs and requirements therefor. An entry criteria is specified by marking as "Mandatory", or "Mand". The criteria is fulfilled if all Mandatory KPIs are available in the session data, i.e. the received network measurements.

A weight is used in the calculation of the total session-specific quality score, as mentioned above which will also be described in more detail later below, which basically indicates the weight this KPI shall have in the total session-specific quality score.

The session scoring schema with priority 0 would always be applicable if none of the other schemas has entry criteria that are fulfilled. In this case the total session-specific quality score may be calculated as an average over all Q values obtained from the available KPIs since the KPIs in this session scoring schema have equal weight according to the session scoring schema with priority 0 shown in FIG. 4.

Figure 5:
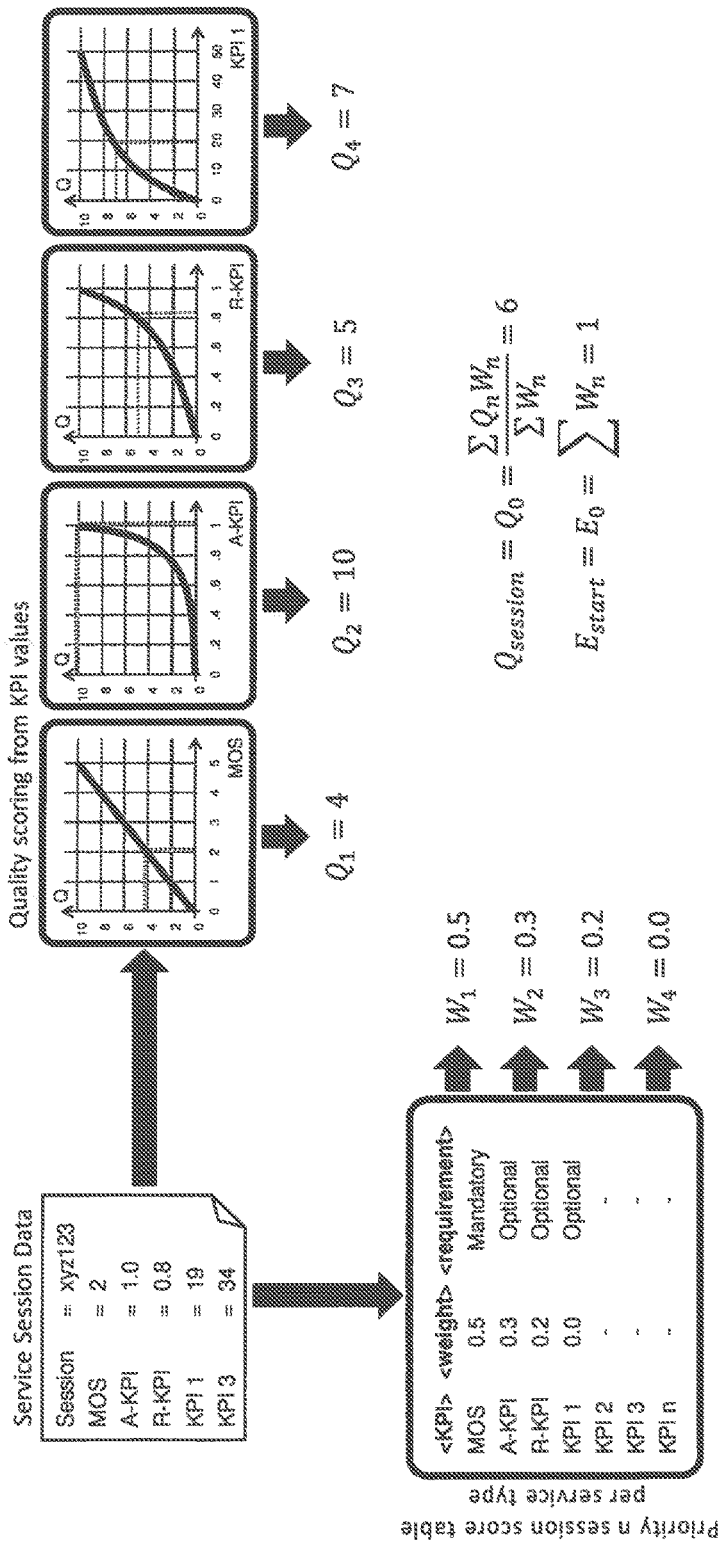
FIG. 5 is a diagram illustrating another example of how a score management node may operate, according to further possible embodiments.

FIG. 5 shows how the total session-specific quality score Q may be calculated based on the individual quality scores Q1-Q4 and the respective weights W1-W4 in the selected session scoring schema which is the session scoring schema denoted Priority n in this example which is somewhat different from the session scoring schema Priority n shown in FIG. 4 in that both A-KPI and R-KPI are optional instead of mandatory.

The total session-specific quality score Q, here denoted Qsession, may be calculated as a weighted average over the Q values obtained from the KPIs that are marked as either mandatory or optional. The weights in the schema are used as weights in the average.

KPIs that are not marked mandatory or optional in the requirement entry can simply be ignored.

The value denoted E is the sum of all weights. E is 1 if all KPIs were present, i.e. have been received. This value is handed over to the following perception scoring as initial weight for that scoring and trust value of the session quality score.

Figure 6:
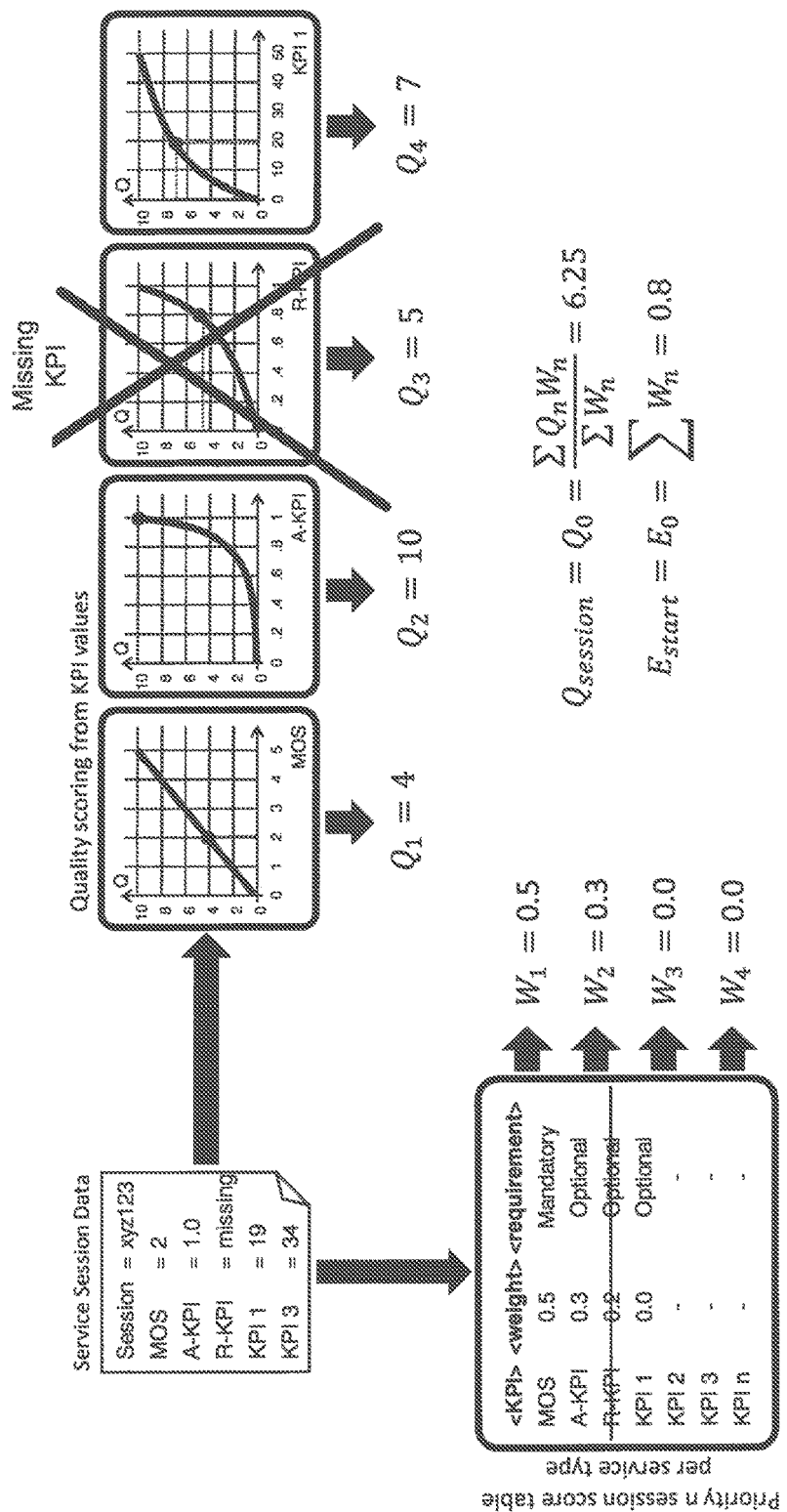
FIG. 6 is a diagram illustrating another example of how a score management node may operate, according to further possible embodiments.

FIG. 6 shows how the session-specific quality score Q may be calculated when some KPI is missing, in this case R-KPI that would otherwise generate Q3=5 which is deleted in the figure.

If the missing KPI is mandatory, the next calculation schema shall be used that does not require that KPI.

If the missing KPI is optional, as in this example where R-KPI is marked Optional in the selected session scoring schema Priority n, as shown in FIGS. 5 and 6, the calculation of the score may be done as described above. The difference is that in this case one of the Q values is missing from the weighted average. This situation is shown in FIG. 6 where R-KPI is missing which means that Q3 cannot be obtained. In the selected session scoring schema Priority n, R-KPI is an optional KPI and the session-specific quality score is only calculated from the remaining KPIs that were marked mandatory or optional.

A difference is then in the E value. It misses the weight from the missing KPI. The trust score of the overall session score is then only 0.8 instead of 1. This way the subsequent perception scoring can treat this particular session score with lower weight in order to accommodate the lowered trust.

The solution and its embodiments described herein basically introduces a generic and configurable scoring operation that may always provide a session-specific quality score.

The better the input data, the better will the resulting total session-specific quality score and perception score be, but also with less than optimal input data a session-specific quality score can be obtained.

If input data, i.e. network measurements, is missing, the weight of the total session-specific quality score of this service session will be reduced in subsequent perception scoring. This reflects that less trust is put in the total session-specific quality score.

Some example scenarios where the above-described solution and embodiments could be employed in practice, will now be outlined. It is typically of interest for a service provider to increase the satisfaction of users when services are delivered by means of a telecommunication network. The embodiments described herein may help the service provider in this respect by enabling a more accurate service evaluation by means of the session-specific quality score, which may be used according to the following examples 1-3.

1) The total session-specific quality score may be used to trigger an alarm in network operation centers indicating that user experience is bad or degrading. Improvements that can be achieved by embodiments herein may include that such alarms may be triggered at different times and more accurately depending on the situation. "False" and misleading alarms may also be avoided. As a result, maintenance technicians and resources may be used more efficiently.

2) Another use of the total session-specific quality score may be to display it on some information systems of a customer care agent or the like. In this scenario the score may be displayed automatically as personal profile data whenever a customer is calling. In this way, the numeric value of the displayed score may represent the customer's satisfaction more accurately.

3) The total session-specific quality score may also be used in more or less automatic proactive marketing as follows. In this case the score may be used as part of a decision logic used to decide if a marketing operation shall be triggered and which customers shall be targeted by the marketing operation. This marketing operation may e.g. involve an offer of a promotion. Communication with the customer in this operation may for example be made by an email or an SMS, being automatically generated. The embodiments herein may thus provide a more accurate quality score that is better reflecting the individual perception of a user. This means that any marketing rules created based on the total session-specific quality score may more accurately select suitable customers for the resulting marketing operation.

The latter example 3 avoids for example that promotions are sent out to customers which are not likely to use the service anyway. Overall, this may thus result in improved utilization of budget and resources.

Figure 7:
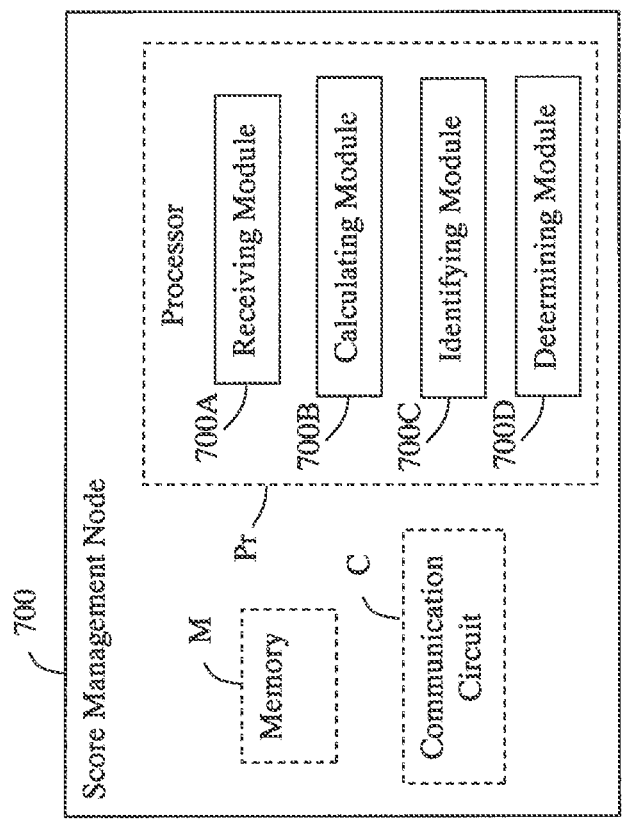
FIG. 7 is a block diagram illustrating a score management node in more detail, according to further possible embodiments.

The block diagram in FIG. 7 illustrates another detailed but non-limiting example of how a score management node 700, which could be the above-described score management node 100 in FIG. 1, may be structured to bring about the above-described solution and embodiments thereof. In this figure, the score management node 700 may thus be configured to operate according to any of the examples and embodiments of employing the solution as described above, where appropriate, and as follows. The score management node 700 in this example is shown in a configuration that comprises a processor "Pr", a memory "M" and a communication circuit "C" with suitable equipment for receiving and transmitting data and messages in the manner described herein.

The communication circuit C in the score management node 700 thus comprises equipment configured for communication with a telecommunication network, not shown, using one or more suitable communication protocols depending on implementation. As in the examples discussed above, the score management node 700 is configured or arranged to perform e.g. the actions of the flow chart illustrated in FIG. 2 in the manner described above. These actions may be performed by means of functional modules in the processor Pr in the score management node 700 as follows.

The score management node 700 is arranged to support service evaluation of a service delivered by means of a telecommunication network. The score management node 700 thus comprises the processor Pr and the memory M, said memory comprising instructions executable by said processor, whereby the score management node 700 is operable as follows.

The score management node 700 is configured to receive network measurements related to at least one service event when the service is delivered to the user. This receiving operation may be performed by a receiving module 700a in the score management node 700, e.g. in the manner described for action 200 above. The score management node 700 is also configured to calculate a quality score Q for each received network measurement by applying a predefined scoring algorithm Q(v) on the network measurement. This calculating operation may be performed by a calculating module 700b in the score management node 700, e.g. in the manner described for action 202 above.

The score management node 700 is also configured to identify, among the calculated quality scores, quality scores Q which are related to a specific service session experienced by the user. This identifying operation may be performed by an identifying module 700c in the score management node 700, e.g. in the manner described for action 204 above. The score management node 700 is also configured to determine a total session-specific quality score for the specific service session based on the identified quality scores Q, wherein the total session-specific quality score is used for evaluation of the delivered service. This determining operation may be performed by a determining module 700d in the score management node 700, e.g. in the manner described for action 206 above.

It should be noted that FIG. 7 illustrates some possible functional units in the score management node 700 and the skilled person is able to implement these functional units in practice using suitable software and hardware. Thus, the solution is generally not limited to the shown structure of the score management node 700, and the functional modules 700a-d may be configured to operate according to any of the features described in this disclosure, where appropriate.

The embodiments and features described herein may thus be implemented in a computer program storage product comprising instructions which, when executed on at least one processor, cause the at least one processor to carry out the above actions e.g. as described for any of FIGS. 1-6. Some examples of how the computer program storage product can be realized in practice are outlined below, and with further reference to FIG. 7.

The processor Pr may comprise a single Central Processing Unit (CPU), or could comprise two or more processing units. For example, the processor Pr may include a general purpose microprocessor, an instruction set processor and/or related chips sets and/or a special purpose microprocessor such as an Application Specific Integrated Circuit (ASIC). The processor Pr may also comprise a storage for caching purposes.

The memory M may comprise the above-mentioned computer readable storage medium or carrier on which the computer program is stored e.g. in the form of computer program modules or the like. For example, the memory M may be a flash memory, a Random-Access Memory (RAM), a Read-Only Memory (ROM) or an Electrically Erasable Programmable ROM (EEPROM). The program modules could in alternative embodiments be distributed on different computer program products in the form of memories within the score management node 700.

It was mentioned above that a perception score P may be determined based on one or more total session-specific quality scores, the perception score P reflecting a user experience of a service. For example, the perception score P can be used in the service evaluation as an estimation of the users' opinion and it is possible to obtain P automatically after every time a service is delivered to a user. Further, since the perception score P is basically calculated from technical measurements in the network related to a specific service session, it is possible to evaluate the performance during that service session based on the perception score P. Since the calculated P is thus "session-specific", any service session that performs less than satisfactorily can be identified and analyzed to improve the service delivery.

The score management node 100 may thus determine the perception score P based on the total session-specific quality score, as of action 208. Some examples of how this could be done will now be described in more detail, which refer to "network measurements" in general which correspond to the above-described network measurements v received in action 200.

An example of a procedure will thus now be described for how the perception score P may be determined by the score management node based on network measurements which could thus be the above-mentioned session-specific network measurements.

The perception score P may be determined by the score management node as follows. The received network measurements v can be seen as "raw data" being used as input in this procedure. In this example, a quality score Q reflecting the user's perception of quality of a delivered service and an associated significance S reflecting the user's perception of importance of the delivered service, are determined based on the network measurements, where Q corresponds to the above-described session-specific quality score which will be denoted "quality score" for short hereafter. In this operation, Q and S may be determined by applying predefined functions on the network measurements, which will be explained in more detail later below. The perception score P is then derived from the quality score Q which is weighted by its associated significance S. Basically, the greater significance S the greater influence has the associated quality score Q on the resulting perception score P.

Before calculating the perception score P, the quality score Q and associated significance S may also be modified in this procedure based on a set of predefined influence factors valid for the user and the delivered service. These influence factors may be related to user expectation considering various characteristics of the user, correlation of different service events occurring within a certain time frame, and fading memory of the user which reduces the significance S of a service event over time. The perception score P is then calculated from the modified quality score Q and associated significance S, and the resulting perception score P can then be made available for supporting evaluation of the service. By using this procedure, the perception score P can be seen as a model for how the user is expected to perceive the service given the circumstances of the delivered service, which model is based on objective and technical network measurements.

Next, the operation of modifying Q and S according to the above influence factors is performed. In this way, Q and S are determined purely from the raw data, i.e. the received network measurements, while Q and S are adjusted by considering the circumstances of the service event which produce the above influence factors, thereby making Q and S more adapted to the actual situation of the delivered service.

Further, the operation of calculating the perception score P from the modified Qm weighted by its associated and modified Sm is performed. Having generated the resulting perception score P, the score management node makes P available for evaluation of the service, e.g. by saving it in a suitable storage or sending it to a service evaluation system or center. For example, P may be sent to the service evaluation system or storage in an http message or an ftp message over an IP network. The service evaluation system or storage may comprise an SQL (Structured Query Language) database or any other suitable type of database.

The quality score Q and associated significance S are thus modified gradually in multiple steps such that the output of modified Q' and/or S' is used as input for further modification, until the thus processed data is used for calculation of P.

There are several advantages of this procedure as compared to conventional ways of obtaining a user's opinion about a service. First, the perception score P is a quite accurate estimation of the users' opinion of the service event considering the prevailing circumstances, and it is possible to obtain P automatically and continuously in real-time, basically after every time a service is delivered to a user. There are thus no restrictions regarding the number of users nor the extension of time which makes it possible to obtain a quite representative perception score P. Second, the perception score P is calculated from technical measurements made in the network related to the service usage which are truthful and "objective" as such, also being readily available, thereby avoiding any dependency on the user's memory and willingness to answer a survey or the like. Third, it is not necessary to spend time and efforts to distribute surveys and to collect and evaluate responses, which may require at least a certain amount of manual work.

Fourth, it is possible to gain further knowledge about the service by determining the perception score P selectively, e.g. for specific types of services, specific types of network measurements, specific users or categories of users, and so forth. Fifth, it is also possible to trace a technical issue that may have caused a "bad" experience of a delivered service by identifying which measurement(s) have generated a low perception score P. It can thus be determined when and how a service was delivered to a presumably dissatisfied user, as indicated by the perception score P, and therefore a likely technical shortcoming that has caused the user's dissatisfaction can also be more easily identified. Once found, the technical issue can be eliminated or repaired. Different needs for improvement of services can also be prioritized based on the knowledge obtained by the perception score P.

It was mentioned above that Q and S may be determined by applying predefined functions or scoring algorithms on the network measurements. Particularly in the above action 202, the score management node 100 calculates a quality score Q for each received network measurement by applying a predefined scoring algorithm Q(v) on the network measurements received in action 200. For example, Q may be determined by applying a first function Q(v) on the network measurements v, and S may be determined by applying a second function S(v) on the network measurements v. Further, the first and second predefined functions Q(v) and S(v) may be dependent on a type of the network measurements used as input to the functions so that a function applied on, say, measurement of data rate is different from a function applied on measurement of call drop rate, to mention two non-limiting but illustrative examples.

The score management node may then modify the determined quality score Q and associated significance S of each service event based on a predefined influence factor applied in each intermediate scoring module. This means that Q and S, or at least one of Q and S, may be modified based on a first predefined influence factor. The once modified Q' and S' may then be modified further based on a second predefined influence factor. The twice modified Q'' and S'' may then be modified further based on a third predefined influence factor, and so forth. Any number of such influence factors may be used.

The predefined influence factors may comprise at least two of:

A) User expectation. In this example, a user profile with characteristics pertaining to the user is defined and at least one user group that matches the user profile is identified. The quality score Q and associated significance S can then be modified based on predefined group-specific parameters valid for the at least one identified user group. The group-specific parameters have thus been defined for a user group to basically describe the user group. Thus, the user can thereby be described by means of membership in one or more of these user groups depending on how relevant the group-specific parameters are to the user.

B) Correlation of different service events. In this example, the significance S of a quality score Q for a first service event is modified by multiplying a correlation factor F reflecting a correlation between the first service event and a second service event when the first and second service events have both occurred within a certain time frame. For example, the correlation factor F may be greater the closer two service events are in time assuming that if one of the events has particularly high significance to the user the other event will also be likely to have high significance to the user if the two service events occur within a short time frame.

C) Fading memory of the user. In this example, the significance S of each quality score Q is reduced over time according to a predefined Significance Reduction Rate, SRR assuming that a user's memory of a service event tends to fade over time and this can be compensated by reducing the significance of the service event over time accordingly. By reducing the significance S over time to simulate the user's fading memory of the service event, the perception score P will likewise be reduced over time. The SRR may be defined to form a step-like function which reduces S in distinct steps over time until it finally reaches zero assuming that the service event is virtually forgotten by the user at this point.

In this way, Q and S have been modified according to the predefined influence factors as exemplified above and the resulting modified quality score "Qm" and associated significance "Sm" are used as input in the next action where the score management node calculates the perception score P based on the modified quality score Qm and associated modified significance Sm. Finally, the calculated perception score P may be made available for use in the service evaluation, e.g. by sending P to a suitable service evaluation system or storage. The protocol used in this communication may be e.g. the hyper-text transfer protocol http or the file transfer protocol ftp, and the perception score P may be sent to the service evaluation system or storage in an http message or an ftp message over an IP network. The service evaluation system or storage may comprise an SQL (Structured Query Language) database or any other suitable type of database.

The perception score P may be calculated according to different possible procedures as follows. In one example, the score management node may calculate the perception score P for multiple service events of service delivery to the user as an average of modified quality scores Qm for the service events weighted by their associated modified significances Sm. In this case, the score management node may calculate the perception score $P_N$ for N service events of service delivery to the user according to the following formula:

$$P_N = \frac{\sum_{n=1}^{N} Q_n S_n}{\sum_{n=1}^{N} S_n}$$

where $Q_n$ is the modified quality score for a service event n and $S_n$ is the associated modified significance for said service event n. In other words, the sum of all N quality scores weighted by their significances is divided by the sum of all the N significances.

The network measurements may be made during a predefined time interval. Further, the score management node may update the perception score P after a new service event n based on a previous perception score $P_{n-1}$ calculated for a previous time interval or service event and a quality score $Q_n$ and associated significance $S_n$ determined for the new service event n, according to the following formula:

$$P_n = \frac{P_{n-1} S_{sum,n-1} + Q_n S_n}{S_{sum,n-1} + S_n}$$

where $S_{sum,n} = S_{sum,n-1} + S_n$ and $P_n$ is the updated perception score. In this way, the perception score P can be kept up-to-date after each new service event by using the above simple calculation which adds the influence of the new service event n on the total P.

In further examples, the score management node may identify at least one type of service for which a modified significance S satisfies a threshold condition. If so, the score management node may then provide the identified at least one type of service as input to root cause analysis when the perception score P is changed significantly. The term "root cause analysis" refers to a procedure for tracing a technical reason for why a service has e.g. been delivered poorly, which procedure as such is somewhat outside the scope of this disclosure. In this embodiment the root cause analysis is deemed to be warranted if the perception score P has changed significantly, particularly when P has decreased which indicates that the user is expected to be dissatisfied with the service as shown by the network measurement(s).

The threshold condition is thus used for finding service events of unexpected perception score P, either surprisingly low or high. This also makes it easy to exactly identify individual service events that may have caused a "bad" experience of a delivered service. For example, the threshold condition may require that the modified significance S is high which indicates that the corresponding service event has had a great influence on the changed P. Thereby, the search for a technical reason can be focused on that service event to some extent.

It was mentioned above that the score management node may identify at least one type of service for which a modified significance S satisfies a threshold condition, and that the identified at least one type of service may then be provided as input to root cause analysis when the perception score P is changed significantly. Examples of how this can be done will now be described. It is assumed that the resulting modified significance S can be detected and collected, e.g. the output from the last intermediate scoring module being the modified significance Sm, in order to generate a table with services that have generated the highest significances as follows.

The final modified significance S of a single service event may thus be used in order to determine what type of service did get the highest overall significance. In this case the significances determined for a certain service type are summed up and the sum value is stored. In this way, a significance table can be built that shows which types of services did have the highest significance in the calculation of the perception score. The significance table can be sorted according to the significance sums resulting in a list with the most significant service event on top of the list. This shows what type of service has produced the highest weight in the calculation of the perception score P.

An example of such a significance table comprises entries for different service types and their resulting significance sum, the number of scorings of service events and a calculated average of the significance for all service events. Whenever a new scoring for a service type Tx with a significance S is obtained, S is added to the significance sum S_Tx of the service type Tx. In this table, also the number of scorings and the average significance are kept for each service type. This provides further information indicating whether the significance of a service type is coming from a small number of very significant service events or from a large number of less significant ones. This may provide further insights into the service event history of the user and the root cause for the perception score.

A table like this is associated with the perception score P. Thus for every perception score P, a table of the most significant experience events can be made available. As similar to the perception score P, this table is user specific and this kind of table can be generated for each user.

It may be of interest to find out why the perception score P has increased or declined, and this significance table can indicate what types of services had the greatest influence on changes in the perception score. Further investigations in the root cause analysis can then focus on these service types accordingly.

Another example of a procedure will now be described for how the perception score P may be determined by the score management node based on network measurements which could thus be the above-mentioned session-specific network measurements.

In this example, a quality score Q reflecting the user's perception of quality of a delivered service, is determined by applying a first function Q(v) on the network measurements v. Further, an associated significance S reflecting the user's perception of importance of the delivered service, is also determined by applying a second function S(v) on the network measurements v. The quality score Q and its associated significance S may be determined in this manner for each network measurement by the score management node. The above-mentioned first and second functions Q(v), S(v) may be predefined for a particular measurement type and they may be maintained in the score management node. Different variants of the first and second functions Q(v), S(v) may thus be maintained for different measurement types which will be described in more detail later below.

The perception score P of the received network measurements v is then derived from the quality scores Q which are weighted by their associated significances S. Basically, the greater significance S the greater influence has the associated quality score Q on the resulting perception score P. This example is directed to describe how the above quality score Q, significance S and perception score P can be determined.

Before calculating the perception score P, one or both of the quality score Q and associated significance S may be modified in this procedure depending on whether the quality score Q determined for a new service delivery event deviates significantly from a "normal", i.e. expected, level of the perception score P calculated previously. For example, the user may be assumed to expect basically the same level of quality "as usual" whenever a service is delivered. If the quality, as determined from one or more network measurements of a new service delivery event, suddenly departs from the expected level, the user can further be assumed to be "surprised" by the unexpected quality level and e.g. the significance S of that event may therefore be increased.

The score management node may further operate to modify the quality score Q and its associated significance S in order to compensate for various circumstances at the respective service delivery, e.g. including the user's expectations of the service delivery as mentioned above. The user's expectations are basically indicated by a previously determined overall perception score valid for one or more previous service deliveries. For example, one or both of the quality score Q and the associated significance S may be modified assuming that Q and/or S of a new service event may be impacted depending on a deviation between the new quality score Q and a previous perception score P, which deviation effectively reflects a degree of assumed "surprise" to the user.

Having generated the resulting perception score P, the score management node makes P available for evaluation of the service, e.g. by saving it in a suitable storage or sending it to a service evaluation system or center. By using this procedure, the perception score P can be seen as a model for how the user is expected to perceive the service given the circumstances of the delivered service, which model is based on objective network measurements. Thus, P is a quantification of the user's assumed perception of the service deliveries.

There are several advantages of this procedure as compared to conventional ways of obtaining a user's opinion about a service. First, the perception score P is a quite accurate estimation of the users' opinion of the service event considering the prevailing circumstances, and it is possible to obtain P automatically and continuously in real-time, basically after every time a service is delivered to a user. There are thus no restrictions regarding the number of users nor the extension of time which makes it possible to obtain a quite representative perception score P. Second, the perception score P is calculated from technical measurements in the network related to the service usage which are true and "objective" as such, also being readily available, thereby avoiding any dependency on the user's memory and willingness to answer a survey or the like. Third, it is not necessary to spend time and efforts to distribute surveys and to collect and evaluate responses, which may require at least a certain amount of manual work.

Fourth, it is possible to gain further knowledge about the service by determining the perception score P selectively, e.g. for specific types of services, specific types of network measurements, specific users or categories of users, and so forth. Fifth, it is also possible to trace a technical issue that may have caused a "bad" experience of a delivered service by identifying which measurement(s) have generated a low perception score P. It can thus be determined when and how a service was delivered to a presumably dissatisfied user, as indicated by the perception score P, and therefore a likely technical shortcoming that has caused the user's dissatisfaction can also be more easily identified. Once found, the technical issue can be eliminated or repaired. Different needs for improvement of services can also be prioritized based on the knowledge obtained by the perception score P. Further features and advantages will be evident in the description of examples that follows.

It was mentioned above that different variants of the first and second functions may thus have been predefined for different network measurement types, e.g. being maintained in the score management node. For example, a variant of function Q(v) or S(v) applied on, say, a measurement of data rate is different from a variant of function Q(v) or S(v) applied on a measurement of call drop rate, to mention a non-limiting but illustrative example.

In another example, the score management node may maintain associations between different network measurement types and different variants of the first and second functions, e.g. in a suitable document or data storage. In this example, the score management node may select a variant of the first and second functions according to said associations for determining the quality score Q and associated significance S for each network measurement. When receiving a network measurement, the score management node is thus able to identify the type of the network measurement and select a variant of the first and second functions according to the identified measurement type. In further examples, each of the first and second functions may be a discrete function or a continuous function.

In a possible example, the score management node may determine multiple pairs of the quality score Q and associated significance S based on the network measurements, e.g. one pair for each network measurement. A pair of Q and S is thus determined for each service event based on the network measurement for that service event. The score management node may then calculate the perception score P as an average of the quality scores Q weighted by their associated significances S in all the above pairs of Q and S. In a further example, this may be done such that when the number of service events is N, the score management node calculates the perception score $P_N$ for the N events of service delivery to the user as $$P_N = \frac{\sum_{n=1}^{N} Q_n S_n}{\sum_{n=1}^{N} S_n}$$

where $Q_n$ is the quality score determined for each service event n and $S_n$ is the associated significance determined for said service event n. In other words, the sum of all N quality scores weighted by their significances is divided by the sum of all the N significances. Thereby, the quality score $Q_n$ for each service event n will impact the overall perception score $P_N$ according to its associated significance $S_n$ and $P_N$ will thus become an accurate representation of the user's perception of quality of service delivery across all service events N. These examples may have the advantage that a perception score can be obtained that reflects the user's experience of a service over a specific selection of service events N. The overall perception score $P_N$ may thus be calculated for any selection of service events N as desired.

Alternatively, an "accumulated" perception score P may be obtained and updated after each new service event as follows. Thus in another example, the score management node may update the perception score P after a new service event n based on a previous perception score $P_{n-1}$ calculated for a previous time interval or service event and a quality score $Q_n$ and associated significance $S_n$ determined for the new service event n, as $$P_n = \frac{P_{n-1} S_{sum,n-1} + Q_n S_n}{S_{sum,n-1} + S_n}$$

where $$S_{sum,n} = \sum_{n=1}^{N} S_n$$

and $P_n$ is the updated perception score. In this way, the perception score P can be kept up-to-date after each new service event by using the above simple calculation which adds the influence of the new service event n on the total P. This example may have the advantage that the updated perception score $P_n$ reflects the user's experience of a service in a "continuous" manner by always taking the latest service event into account.

In yet another example, the score management node may determine the perception score P for a service of a particular type by calculating the perception score P according to the above procedure for multiple users upon service delivery to the users with a service of said particular type. The additional information provided by this example may be used to support or facilitate tracing of any technical issue that may cause a low perception score P for the particular service type.

It was mentioned above that the score management node may maintain associations between the respective network measurement types and the variants of the first and second functions Q(v), S(v). Such variants of the functions may be associated with network measurement types in a table where a variant Q1(v) of the first function and a variant S1(v) of the second function are associated with a measurement "type 1". Further, another variant Q2(v) of the first function and another variant S2(v) of the second function are associated with another measurement "type 2", and so forth. By identifying the measurement type of an incoming network measurement, the score management node can thus find the correct variants of the first and second functions Q(v), S(v) in this table and apply them accordingly to determine Q and S.

Another table may comprise variants of the functions Q(v) and S(v) for two network measurement types, video-frame rate and the time needed to download a web page. It was further mentioned above that either of the first and second functions may be a discrete function or a continuous function. Thus, each of the first function Q(v) and the second function S(v) may be a discrete function for the measurement type video-frame rate, such that Q increases and S decreases in discrete steps upon increased video-frame rate v. Q may increase in discrete steps upon increased video-frame rate v in frames per second, fps. For example, Q=0 when v is lower than 10, Q=1 when v is between 10 and 15, Q=2 when v is between 15 and 20, Q=3 when v is between 20 and 25, and Q=4 when v is higher than 25. On the other hand, each of the first function Q(v) and the second function S(v) may be a continuous function for the measurement type time needed to download a web page, meaning that Q decreases and S increases continuously upon increased time needed to download a web page.

It should be noted that the functions Q(v) and S(v) for the measurement type video-frame rate produce higher Q and lower S values the higher the video-frame rate is, while the functions Q(v) and S(v) for the measurement type video-frame rate produce lower Q and higher S values the longer time needed to download a web page. By these variants of functions Q(v) and S(v), it is assumed that Q is relatively low and S is relatively high when the network measurement v indicates "bad" quality, either by low video-frame rate or by higher the time needed to download a web page, and vice versa.

While the solution has been described with reference to specific exemplifying embodiments, the description is generally only intended to illustrate the inventive concept and should not be taken as limiting the scope of the solution. For example, the terms "score management node", "network measurement", "perception score", "service event", "quality score", "service session", "session scoring schema" and "entry criteria" have been used throughout this disclosure, although any other corresponding entities, functions, and/or parameters could also be used having the features and characteristics described here.

The invention claimed is:

1. A method performed by a score management node for supporting service evaluation of a service delivered to a user by means of a telecommunication network, the method comprising:
   receiving network measurements related to at least one service event when the service is delivered to the user,
   for each one of at least a plurality of the received network measurements, calculating a quality score for the received network measurement by applying a predefined scoring algorithm Q(v) on the network measurement, wherein v is a network measurement,
   identifying, from among the calculated quality scores, quality scores that are related to a specific service session experienced by the user, and
   determining a total session-specific quality score for the specific service session based on the identified quality scores, wherein the total session-specific quality score is used for evaluation of the delivered service.

2. The method of claim 1, wherein the total session-specific quality score is determined based on a session scoring schema comprising a set of weighted measurement types such that the total session-specific quality score is calculated as a weighted average of the identified quality scores, wherein for each of the calculated quality scores, the calculated quality score is weighted according to the type of measurement that was used for determining the calculated quality score.

3. The method of claim 2, wherein the session scoring schema is selected from a set of predefined session scoring schemas depending on which types of network measurements have been made for the at least one service event.

4. The method of claim 3, wherein each session scoring schema in the set of predefined session scoring schemas comprises an entry criteria indicating at least one of: a mandatory measurement type and an optional measurement type.

5. The method of claim 3, wherein the session scoring schema is selected further depending on priorities assigned to the session scoring schemas in the set of predefined session scoring schemas.

6. The method of claim 3, wherein the session scoring schemas in the set of predefined session scoring schemas are defined for different services or experience types.

7. The method of claim 2, wherein the measurement types include one or more Key Performance Indicators, KPIs.

8. The method of claim 1, further comprising determining a perception score P based on the total session-specific quality score, the perception score P reflecting a user experience of a service.

9. The method of claim 8, wherein the perception score P is determined based on total session-specific quality scores calculated for multiple service sessions.

10. The method of claim 1, wherein the network measurements are related to any one or more of: a time needed to download data, a time from service request until delivery, call drop rate, data rate, and data error rate.

11. The method of claim 1, wherein the network measurements are received in a message according a hyper-text transfer protocol or a file transfer protocol.

12. The method of claim 1, wherein
   the calculated quality scores that are related to the specific service session experienced by the user comprises a first quality score (Q1) and a second quality score (Q1),
   the method further comprises obtaining i) a first significance score (S1) associated with the first quality score and ii) a second significance score (S2) associated with the second quality score, and
   the step of determining the total session-specific quality score for the specific service session based on the identified quality scores comprises calculating: (Q1)(S1) +(Q1)(S2).

13. The method of claim 12, wherein
   Q1=Q(v1), wherein v1 is a first network measurement,
   Q2=Q(v2), wherein v2 is a second network measurement,
   S1 is a function of v1, and
   S2 is a function of v2.

14. The method of claim 1, wherein
   the method further comprises: i) obtaining a user profile associated with the user, ii) identifying a user group that matches the profile, and iii) obtaining a predefined group-specific parameter valid for the identified user group,
   the identified quality scores comprises at least a first quality score, and the step of determining the total session-specific quality score for the specific service session based on the identified quality scores comprises modifying the first quality score using the predefined group-specific parameter.

15. A computer program product comprising a non-transitory computer readable medium storing instructions which, when executed on at least one processor, cause the at least one processor to carry out the method according to claim 1.

16. A score management node arranged to support service evaluation of a service delivered to a user by means of a telecommunication network, the score management node comprising:
a receiver operable to receive network measurements related to at least one service event when the service is delivered to the user;
a processor coupled to the receiver; and
a memory containing instructions executable by the processor, wherein the processor is configured to cause the score management node to:
for each one of at least a plurality of the received network measurements, calculate a quality score for the received network measurement by applying a predefined scoring algorithm $Q(v)$ on the network measurement,
identify, from among the calculated quality scores, quality scores that are related to a specific service session experienced by the user, and
determine a total session-specific quality score for the specific service session based on the identified quality scores, wherein the total session-specific quality score is used for evaluation of the delivered service.

17. The score management node of claim 16, wherein the score management node is configured to determine the total session-specific quality score based on a session scoring schema comprising a set of weighted measurement types such that the total session-specific quality score is calculated as a weighted average of the identified quality scores, wherein for each of the calculated quality scores, the calculated quality score is weighted according to the type of measurement that was used for determining the calculated quality score.

18. The score management node of claim 17, wherein the score management node is configured to select the session scoring schema from a set of predefined session scoring schemas depending on which types of network measurements have been made for the at least one service event.

19. The score management node of claim 18, wherein each session scoring schema in the set of predefined session scoring schemas comprises an entry criteria indicating at least one of a mandatory measurement type and an optional measurement type.

20. The score management node of claim 18, wherein the score management node is configured to select the session scoring schema further depending on priorities assigned to the session scoring schemas in the set of predefined session scoring schemas.

21. The score management node of claim 18, wherein the session scoring schemas in the set of predefined session scoring schemas are defined for different services or experience types.

22. The score management node of claim 17, wherein the measurement types include one or more Key Performance Indicators, KPIs.

23. The score management node of claim 16, wherein the score management node is configured to determine a perception score P based on the total session-specific quality score, the perception score P reflecting a user experience of a service.

24. The score management node of claim 23, wherein the score management node is configured to determine the perception score P based on total session-specific quality scores calculated for multiple service sessions.

25. The score management node of claim 16, wherein the network measurements are related to any of: a time needed to download data, a time from service request until delivery, call drop rate, data rate, and data error rate.

26. The score management node of claim 16, wherein the score management node is configured to receive the network measurements in a message according to a hyper-text transfer protocol or a file transfer protocol ftp.

* * * * *